Nov. 21, 1950    O. E. STAPLES    2,530,549
METHOD OF MANUFACTURING CUTTERS
Original Filed Sept. 22, 1943    4 Sheets-Sheet 2

INVENTOR.
OTIS E. STAPLES
BY
Kwis Hudson Boughton & Williams
ATTORNEYS

Nov. 21, 1950  O. E. STAPLES  2,530,549
METHOD OF MANUFACTURING CUTTERS
Original Filed Sept. 22, 1943  4 Sheets-Sheet 3

INVENTOR.
OTIS E. STAPLES
BY Kwis Hudson Boughton & Williams
ATTORNEYS

Nov. 21, 1950     O. E. STAPLES     2,530,549
METHOD OF MANUFACTURING CUTTERS

Original Filed Sept. 22, 1943     4 Sheets-Sheet 4

INVENTOR.
OTIS E. STAPLES
BY
*Lewis Hudson Boughton & Williams*
ATTORNEYS

Patented Nov. 21, 1950

2,530,549

UNITED STATES PATENT OFFICE 2,530,549

METHOD OF MANUFACTURING CUTTERS

Otis E. Staples, Euclid, Ohio, assignor to The Cleveland Hobbing Machine Company, Cleveland, Ohio, a corporation of Ohio Continuation of application Serial No. 503,373, September 22, 1943. This application April 22, 1947, Serial No. 743,055

7 Claims. (Cl. 76—101)

1

The present invention relates to tools or cutters and/or cams, of the type employed in machines of the character disclosed in Theodore F. Carlin U. S. Patent No. 2,233,399, and, more particularly, to a method of making and/or laying out the same; the present application being a continuation of my prior application S. N. 503,373, filed on September 22, 1943 now abandoned.

Prior to the present invention, cutters of the type employed in machines of the character disclosed in the aforesaid Carlin patent, were made by a "cut and try" method, by which method it is impractical to make any but the simplest type of cutters to the accuracy required of modern machine tools. Cursory consideration of the matter will show that the making of a cutter having two side cutting edges as distinguished from circumferential cutting edges, which side cutting edges are required to form shoulders of predetermined angles on a work blank and located at predetermined distances apart, is impractical by a cut and try method.

The principal object of the present invention is, therefore, the provision of a scientific method of accurately laying out or making cutters of the type referred to. According to the provisions of the present invention, the dimensions of the cutter can be determined with precision, with the result that the design and layout thereof can be expedited and the cutters readily manufactured and reproduced with accuracy.

Further objects and advantages of the invention reside in the novel steps of procedure employed in producing an improved cutter of the character referred to as will be apparent to those skilled in the art to which the invention relates, from the following description or explanation and the accompanying drawings forming a part of this specification, in which:

Figs. 6 and 7 are diagrammatic views illustrating the method of determining the correction for

2 the shoulder forming edges incident to the top rake angle; and

Figure 8:
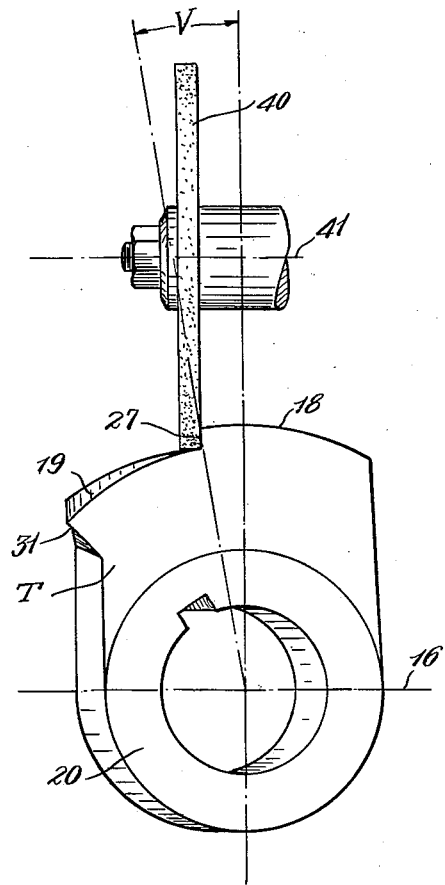
Figure 9:
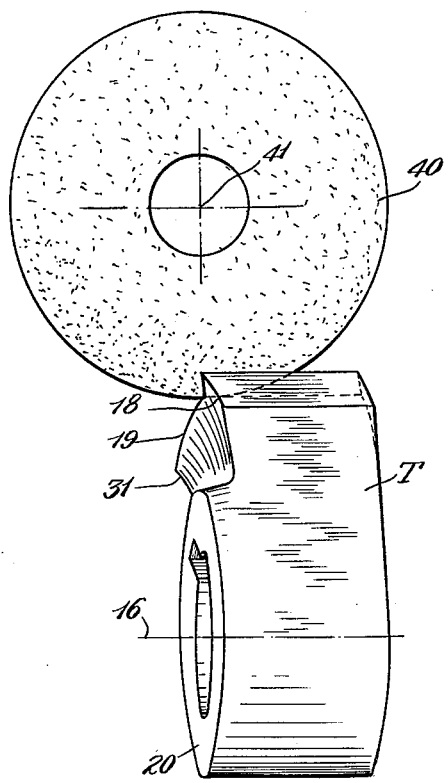
Figure 10:
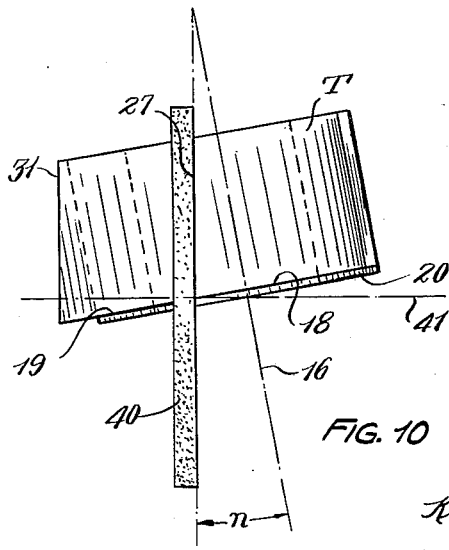

Figs. 8, 9 and 10 illustrate a method of grinding the shoulder forming edges.

As previously stated, the present invention relates to cutters and cams of the character employed on machines of the type disclosed in U. S. Patent No. 2,233,399. Reference to said patent will show that the machine disclosed therein resembles a more or less conventional lathe the details of which are not reproduced here. It is sufficient to note that, as diagrammatically represented in Fig. 1 of the drawings of this application, the work blank 15 is supported between a chuck (not shown) and a tail center 23 of the machine. The work blank 15 is turned to the desired form by a disk or segment-shaped tool or cutter T rotatably supported on the tool slide of the machine for rotation about an axis offset from and angularly disposed to the axis of rotation of the work. In operation, the tool or cutter is fed longitudinally of the axis of rotation of the work blank and simultaneously rotated in a predetermined manner at variable speeds by a cam C and cam follower 32 operatively connected thereto by mechanism comprising a rack 29 and pinion 28. Alternatively, the work blank may be moved relative to the tool or cutter and cam, etc., see Theodore F. Carlin U. S. Patent No. 2,233,398. If desired, the tool T may be rotated at a uniform rate of speed and the relative movement therebetween and the work longitudinally of the latter effected at a variable rate of speed, or both of said movements may be effected at variable rates of speed, so long as the relative angular rotation of the tool T per unit of linear feed is varied from time to time in a predetermined manner.

In operation, the relative feed movements between the tool and work blank, that is the relative movements therebetween except the rotation of the work blank, generally speaking, are as though the cutter or tool were rolled along the work, with the result that the respective surfaces of the work may be said to be generated by the tool. When the relative feed movements are such that the effect is a true rolling motion between the arcuately shaped cutting edge of the tool or cutter and the section of the finished work formed thereby, the cutter is herein said to be rolled or rolling along the work without slip. If the relative feed movements are such that in effect the cutter does not travel lengthwise of the work as fast as it would if rolled or rolling along the work without slip, the cutter is said to be rolled or rolling along the work with "underslip." The reverse condition is referred to as "overslip."

The present invention is concerned primarily with the method of designing and laying out of cutters of the type referred to for producing articles or work having portions of different diameters connected by shoulders, which shoulders are formed by side cutting edges on the tool or cutter; the cutters as articles of manufacture are disclosed and claimed in my copending divisional application, Ser. No. 38,571, filed on July 14, 1948. In producing work of the nature mentioned, the relative feed movements between the tool or cutter and work are preferably accomplished by rotating the tool or cutter at variable rates of speed and moving the work blank lengthwise at a uniform rate of speed. However, it is to be understood that the tool or cutter may be rotated at a uniform rate of speed and the relative movement between the same and the work blank longitudinally or lengthwise of the axis of rotation of the work blank effected at a nonuniform rate of speed, etc. The cutter and cam combinations must be specifically designed for each differently shaped article to be produced since the relative angular rotation of the cutter per unit of relative longitudinal movement must be varied in a definite relationship. In other words, each cutter or tool and cam combination is designed for use in connection with a particular machine and the production of a particular article.

The method of the present invention will be described or explained with reference to the design and layout of a cutter and cam for producing an article having a shape which is fairly characteristic of the articles which the machines of the aforesaid Carlin patents are particularly adapted to turn or produce. With the foregoing in mind, it is assumed that it is desired to make a cutter or tool and cam combination for the machine shown in the drawings of Carlin Patent No. 2,233,399 to produce an article 9 having three cylindrical portions or sections 10, 11 and 12, the diameters A, B and D of which are 1.000, 1.375 and 1.625 inches, respectively, connected by radial shoulders 13 and 14, from a cylindrical work blank 15 shown in dot-dash lines in Fig. 1, the outside diameter of which blank is the same as the diameter of section 12.

The first step is to empirically determine one of the following: (1) the offset E, that is the distance between the axis of rotation 16 of the tool or cutter and the axis of rotation 17 of the work blank measured in the plane of the axis of rotation of the work blank normal to the axis of rotation of the tool or cutter; (2) the radius F of the arcuately shaped cutting edge 18 of the tool furthest from the axis of rotation 16 of the tool T; or (3) the radius G of the arcuately shaped cutting edge 19 nearest the axis of rotation 16 of the tool. These dimensions or distances are optional but when any one is once selected or determined, substantially all the other dimensions of the tool and cam are determined or fixed, and the cutter must be operated at all times in the position determined thereby.

In determining one of the three dimensions referred to above, it must be kept in mind that the radius G of the arcuately shaped cutting edge 19 nearest the axis of rotation 16 of the tool cannot be less than the radius of the hub 20 or like part of the tool, plus any required or desired clearance, and that the radius F of the cutting edge 18 must equal G plus one-half the difference between the diameters of the largest and smallest sections of the article to be produced. The amount of clearance provided is largely optional but some clearance must be provided to allow for a top rake angle. Other factors that must be considered in determining or selecting the clearance are the characteristics of the machine, cutter sizes which are practical, and practical limitations of offset E. The maximum distance that the arcuately shaped cutting edge 18 of greatest radius can be away from the axis of rotation 16 of the tool is determined by practical limits of so-called "overhang" consistent with other requirements, such as rigidity, minimization of chatter, etc. The offset E equals the radius of any arcuately shaped cutting edge, plus the radius of the section of work turned thereby.

Having in mind the dimensions aforesaid and the machines of the aforesaid Carlin patents, an offset of 2.500 inches is appropriate and is selected. From the foregoing it follows that $$F = E - \frac{A}{2}$$
$$= 2.500 - \frac{1}{2}$$
$$= 2.000 \text{ inches}$$
$$G = F - \frac{B-A}{2}$$
$$= 2.000 - \frac{1.375 - 1.000}{2}$$
$$= 1.8125 \text{ inches}$$

The cutter or tool may, if desired, be fed into depth either lengthwise or transversely of the work, but preferably it is "rolled" into depth. In either event the cutter must clear the blank at the beginning of the operation so that the blank can be readily positioned in the machine. Assuming that the cutter is to be rolled into depth by movements substantially the same as those employed to turn the initial section 10 of the article to be formed, the axis of the cutter must be located beyond the end of the work blank a distance H equal to the base of a right angle, the other sides of which are F and the distance between the axis of the cutter and the outside of the work blank plus some suitable clearance, such as 10% of the actual amount required. Having in mind the dimensions given above, it follows that $$H = \sqrt{(F^2) - \left(E - \frac{D}{2}\right)^2} + 10\%$$
$$= 1.10\sqrt{(2.000)^2 - \left(2.500 - \frac{1.375}{2}\right)^2}$$
$$= 1.180817 \text{ inches}$$

If the relative movements between the tool or cutter and work were such that the arcuately shaped cutting edge 18 extended rolled on the section 10 of the work extended, the cutter would rotate through an angle I while the axis thereof traveled to a point 25 a distance H. This angle is:

$$\cos I = \frac{E - \frac{D}{2}}{F}$$
$$= \frac{2.500 - \frac{1.375}{2}}{2}$$
$$= .84375$$

or

Angle $I = 32° \ 27' \ 34''$

For convenience, this angle is corrected to the nearest degree and hence an angle of 32° is used.

The mechanism for connecting the cam roller and the tool or cutter spindle, of necessity, is such that a certain cam rise is necessary to produce a unit of rotation of the tool or cutter or vice versa. This factor of the machine is herein designated J, and assuming that in the instant machine this mechanism is such that a rotation of 1° of the tool or cutter is produced by .03 inch of cam rise, the factor J equals, .03. The cam rise K required during the approach portion of the cycle of operation, that is to rotate the cutter 32°, is determined by multiplying 32 by the factor J of the machine, which is assumed to be .03. Therefore $$K = J \times I$$
$$= .03 \times 32$$
$$= .960 \text{ inch}$$

While the axis of the cutter or tool is traveling from the point 25, in line with the end of the work, to a point 26, in line with the shoulder 13, a distance L equal to the length of the section 10 of the work, which it will be assumed is 1.500 inches, the cutter is preferably rotated through an angle M such that a slight amount of underslip occurs, preferably 10% to 20%. M is then determined as follows:

$$M = \left(\frac{L}{2F \times 3.1416} \times 360°\right) - 20\%$$
$$= \left(\frac{1.500}{2 \times 2 \times 3.1416} \times 360°\right) \times .8$$
$$= 34.37741°$$

For convenience, 35°, the nearest higher even angle, is used.

The cam rise N required to produce this rotation of the tool is 35 times .030 inch or 1.05 inches.

The relative movements between the cutter and work occurring while the section 10 is being formed, cannot be continued after the shoulder 13 is formed by the cutting edge 27 connecting the cutting edges or arcs 18 and 19 without destroying the left-hand corner of section 11 of the work. In order to prevent destruction of this corner, the speed of rotation of the cutter is accelerated temporarily sufficiently to allow the shoulder forming edge 27 to clear the shoulder 13, and thereafter continued at a reduced speed but at a speed higher than that at which it was operating during formation of the section 10. The higher speed of rotation of the cutter, during which period "overslip" is occurring, preferably continues until the axis of the cutter reaches a point 24, a distance P from the point 26. While the amount of overslip effected and the distance through which it continues depend upon the angle of the shoulder, etc., the amount of "overslip" effected is preferably about 30% and the distance P through which it is continued is preferably equal to the length of the shoulder 13, that is one-half the difference between the diameters of the adjacent portions 10 and 11, which is .1875 inch.

From the foregoing, the preferred angle Q through which the cutter is rotated while it is traveling from the point 26 to the point 24 is calculated as follows $$Q = \left(\frac{P}{2G \times 3.1416} \times 360°\right) + 30\%$$
$$= \left(\frac{.1875}{2 \times 1.8125 \times 3.1416} \times 360°\right) 1.30$$
$$= 7.257°$$

For convenience, an angle of 8° is used.

The cam rise R required to produce this rotation of the tool when calculated as indicated above is .24 inch.

While the axis of the tool is traveling from the point 24 to the point 30, in line with the shoulder 14, a distance S equal to the length of the portion 11 minus P, the cutter is preferably rotated through an angle U. Assuming that the length of the shoulder 11 is 1.250 inches, then S is equal to 1.0625 inches.

The angle U is preferably such that from 10% to 20% "underslip" occurs while the cutter is traveling from the point 24 to the point 30. Therefore $$U = \left(\frac{S}{2 \times G \times 3.1416} \times 360°\right) - 10\%$$
$$= \left(\frac{1.0625}{11.3883} \times 360°\right) .90$$
$$= 30.2292°$$

For convenience, an angle of 30° is employed which will produce an "underslip" slightly in excess of 10%. The cam rise V required to produce this angular rotation of the tool is .9 inch determined as indicated above.

In order to prevent destruction of the outer corner of the shoulder 14 by the shoulder forming edge 31 of the cutter, the rotation of the cutter is again accelerated in the same manner as previously referred to with respect to the shoulder 13. The acceleration is preferably such that approximately 30% overslip occurs and is continued to a point 33, a distance W equal to the height of the shoulder 14, which is .125 inch. The desired angular rotation X to be imparted to the tool during this movement is calculated as follows:

$$X = \left(\frac{W}{2\left(E - \frac{D}{2}\right) \times 3.1416} \times 360°\right) + 30\%$$
$$= \left(\frac{.125}{2 \times \left(2.500 - \frac{1.625}{2}\right) \times 3.1416} \times 360°\right) 1.30$$
$$= 5.518°$$

For convenience, 6° is used. The cam rise Y required to produce this rotation is .18 inch calculated as indicated above.

It will be seen, therefore, that each arcuately shaped cutting edge preferably has a length which is equal to 80%–90% of the length of the portion of the work to be turned thereby plus approximately 130% of the difference between the radius of that arcuately shaped cutting edge and the radius of the next preceding arcuately shaped cutting edge.

After the cutting operation has been completed, the work blank has to be removed. When possible, the cutter is preferably made segment-like in shape so that the cutter can, in effect, be withdrawn from the work by continuing its rotation for a short period. This is accomplished by continuing the feed movement and extending the cam slightly. Any suitable cam rise can be employed depending upon the speed with which it is desired to have the tool move clear of the work.

Figure 1:
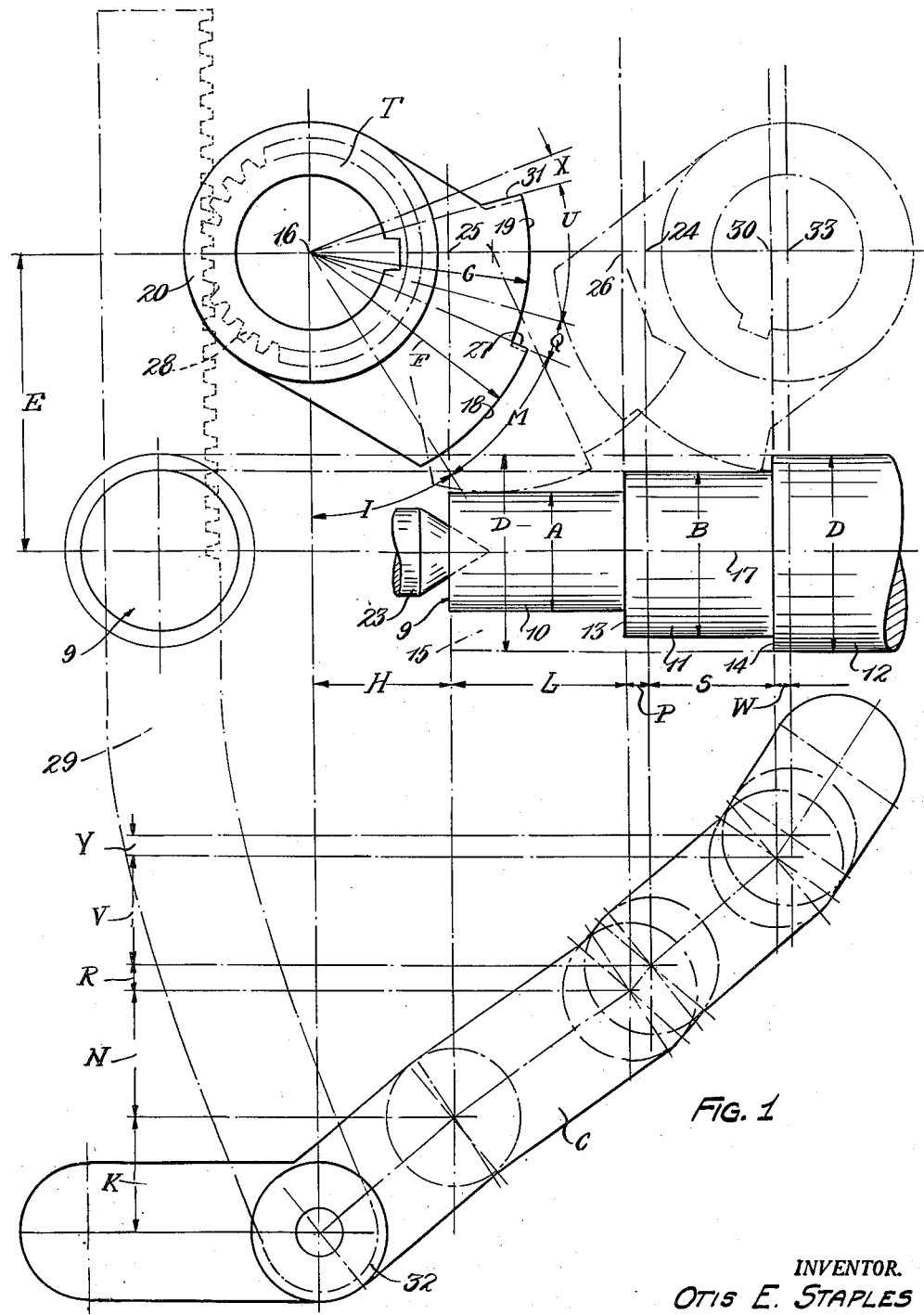
Fig. 1 is a diagrammatic view illustrating that part of the method of the invention wherein the cutter is calculated and/or laid out, disregarding the top rake and clearance angles.

Two of the numerous positions assumed by the cutter or tool as it travels lengthwise of the work blank are indicated by dot-dash lines in Fig. 1. The reference character 32 designates the cam roller which cooperates with the cam C to effect the rotation of the cutter, and a number of the various positions which the roller assumes as it travels along the cam are shown in Fig. 1.

The cutter or tool T is made cylindrical and operated below center, that is, the cutting edges preferably engage the work below the plane 35, see Figs. 3 and 4, of the axis of rotation of the work perpendicular to the axis of rotation of the tool or cutter. In addition, the cutter is provided with a suitable top rake angle C. This arrangement provides the necessary clearance angle even though the periphery of the cutter is cylindrical. The cutting edge of greatest radius is preferably operated slightly below center and the distance that the other edges are below center will depend upon the amount that they are set back with respect to the cutting edge of greatest radius and upon the value of the angle of top rake.

Because the cutter under consideration is to be operated in such a position that the arcuately shaped cutting edges 18, etc. cut below the center plane of the work blank, the radii of the cutter previously determined must be increased incident to the curvature of the blank. Preferably the corrected diameters of the arcuately shaped cutting edges are determined in the following manner. An arbitrary radius $a$ not less than F, plus .030 to .050 inch, is assumed as the intersection $b$ of the surface 36, produced by the top rake angle extended, with the plane 35 of the axis of rotation of the work perpendicular to the axis of rotation of the tool. It has been found that with a normal top rake angle $c$ of about 25° this gives about the minimum clearance angle at which the cutting edge of greatest radius can be efficiently operated.

Figure 2:
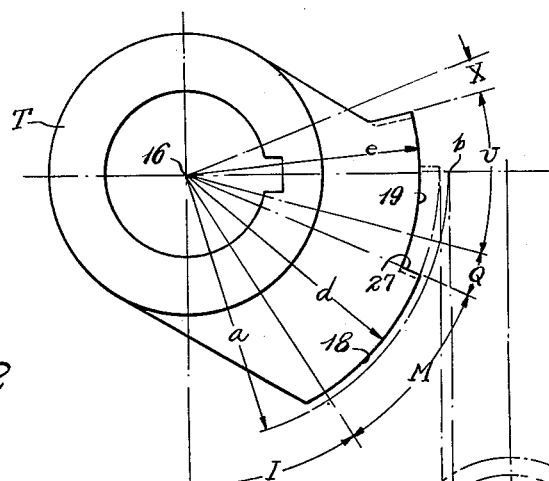
Figs. 2 and 3 are diagrammatic views illustrating the method of determining the corrections to the radii of the arcuate cutting edges shown in Fig. 1 incident to top rake and clearance angles.
Figure 3:
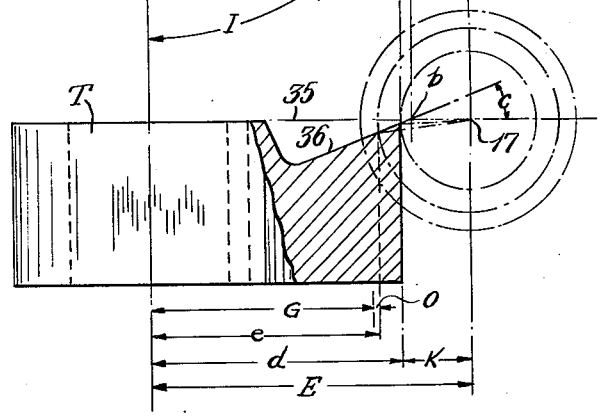
Figure 4:
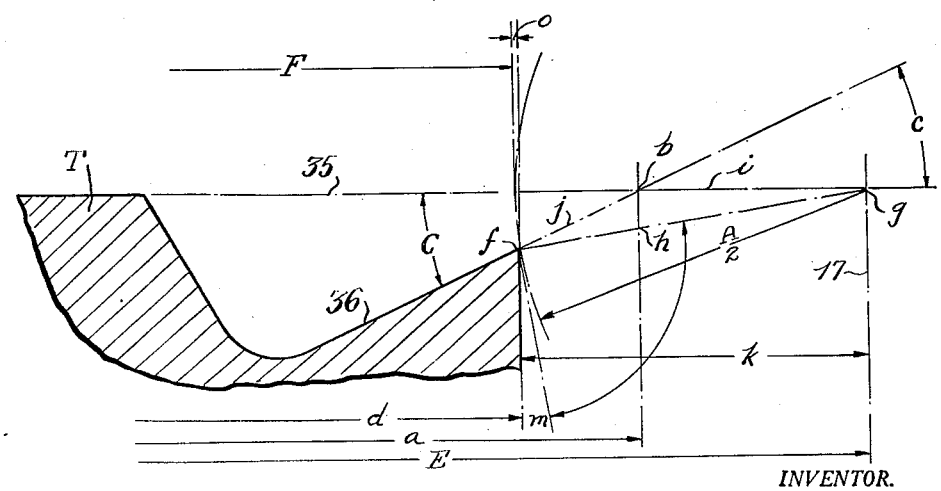
Fig. 4 is an enlarged view of a portion of Fig. 3.

Referring to Figs. 2, 3 and 4, $d$ and $e$ are the corrected radii of the arcuately shaped cutting edges 18 and 19 respectively for producing or turning the sections 10 and 11 of the work. Assuming that the top rake angle $c$ is 25° and that $a$ equals $F+.050$ inch, that $f$ is the intersection of the surface 36 of the tool with the cutting edge 18 thereof, that $g$ is the intersection of the plane 35 with the axis of rotation 17 of the work, and that $h$, $i$, and $j$ are the sides of the triangle $b$, $f$, and $g$ opposite the angles $b$, $f$, and $g$ respectively, then $$\angle b = 180° - c$$
$$= 180° - 25°$$
$$= 155°$$
$$h = \frac{A}{2}$$
$$= \frac{1}{2}$$
$$= .500 \text{ inch}$$
$$i = E - a$$
$$= 2.500 - 2.050$$
$$= .450 \text{ inch}$$
$$\sin f = i \times \frac{\sin b}{h}$$
$$= \frac{.450 \times .42262}{.500}$$
$$= .38036$$
$$\angle f = 22° 21' 20''$$
$$\angle g = 180° - (b+f)$$
$$= 180° - (155° + 22° 21' 20'')$$
$$= 2° 38' 40''$$

$k$, the distance from the corrected cutting edge 18 to the axis 17 of the work blank is calculated as follows:

$$k = h \cos g$$
$$= .500 \times .9989333$$
$$= .49946 \text{ inch}$$
$$d = E - k$$
$$= 2.500 - .4995$$
$$= 2.0005 \text{ inches}$$

The amount $o$ to be added to F as the correction incident to the location of the cutting edge 18 below the plane 35 is calculated as follows:

$$o = \frac{A}{2} - k$$
$$= \frac{A}{2} - (E - d)$$
$$= \frac{1}{2} - (2.500 - 2.0005)$$
$$= .0005 \text{ inch}$$

The clearance angle $m$ is the same as the angle $g$ or 2° 38' 40''. As shown in Fig. 4, the angles $g$, etc. are exaggerated for clearness.

The correction $o'$ for radius G is figured in a similar manner and in the example given is .00836 inch. The clearance angle in the case of the cutting edge 19 is then 8° 56' 30''.

Figure 5:
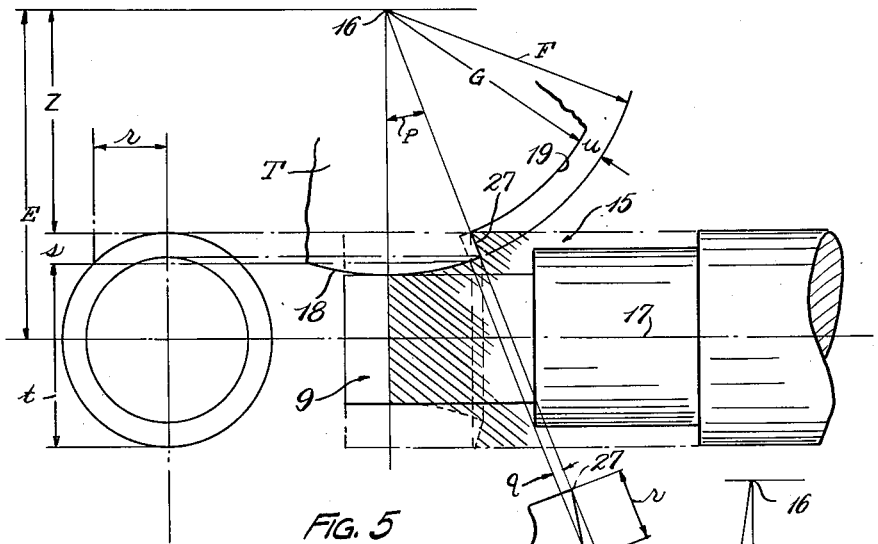
Fig. 5 is a diagrammatic view illustrating that part of the method wherein the side clearance angle for the cutting edges which form the shoulders is determined.

The minimum side clearance angle $n$ on the shoulder forming cutting edge 27 is determined by the angle at the point of maximum undercut, that is, the angle at the point where the radially outer end of the shoulder forming cutting edge 27 undercuts the blank 15 to the greatest extent, see Fig. 5.

The cosine of the angle $p$ at which maximum undercut occurs is equal to Z, that is, the distance from the center 16 of the cutter to the outside diameter of the work blank, divided by G, the radius of the arcuate cutting edge 19 of lesser radius, in other words $$\cos p = \frac{Z}{G}$$
$$= \frac{1.6875}{1.8125}$$
$$= .93103$$

Therefore, $$\angle p = 21° 24' 12''$$

For convenience, 22° will be employed.

Then the tangent of $n$, the minimum side clearance angle, is equal to $q$, the depth of undercut, divided by $r$, one-half the chord of the circle of outside diameter of the blank at the height of undercut $s$, or the square root of $t$ times $s$ where $t$ is equal to the diameter D of the work blank 15 minus $s$. The depth of undercut $q$ is equal to the tangent of the angle of maximum undercut multiplied by the length of undercut $u$, that is, the length of the shoulder forming edge 27. Expressed mathematically, $$q = \tan p \times u$$
$$= \tan 22° (F - G)$$
$$= .40403 (2.000 - 1.8125)$$
$$= .07575 \text{ inch}$$
$$s = \sqrt{u^2 + q^2} = \sqrt{(F-G)^2 + q^2}$$
$$s = 0.202 \text{ inch}$$
$$t = D - s$$
$$= 1.625 - .202$$
$$= 1.423 \text{ inch}$$
$$r = \sqrt{t \times s}$$

$$= \sqrt{(D-s)s}$$
$$= \sqrt{(1.625-.202).202}$$
$$= .536 \text{ inch}$$

$$\text{Tan } n = \frac{q}{r}$$
$$= \frac{(\tan p \times u)}{\sqrt{(D-s)s}}$$
$$= \frac{.07575}{.536}$$
$$= .1413246$$

Therefore, the minimum clearance angle $n = 8° 2' 4''$.

For convenience, this angle is increased to an even angle. In practice it has been found that a side clearance angle of 10° works satisfactorily in most instances and is usually employed.

Figure 6:
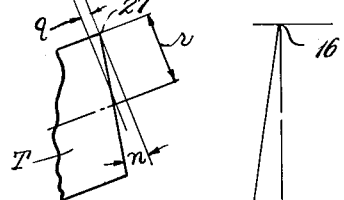
Figure 6:
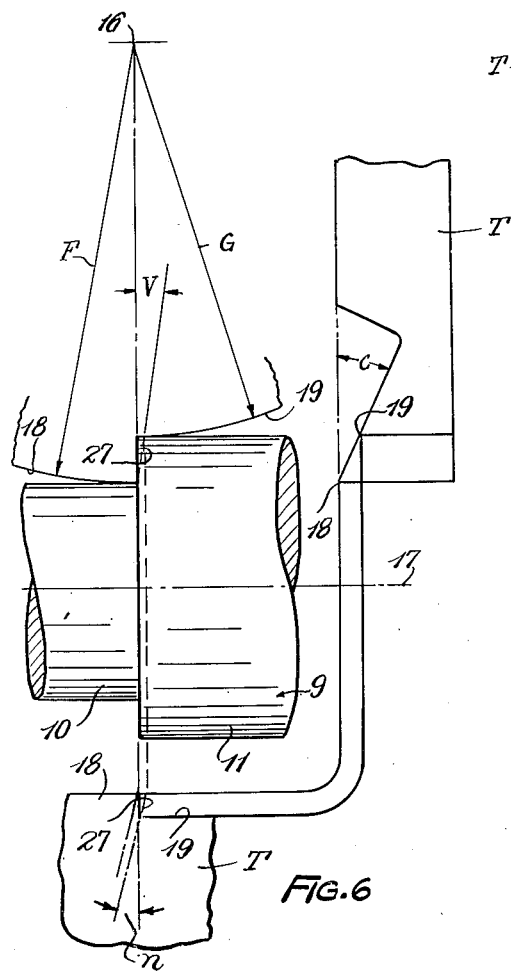

In laying the tool out in a plane normal to the axis of rotation thereof and including the axis of rotation of the work blank, the radial angle of the cutting edge or edges forming the shoulders must be corrected by an amount equal to angle $v$, see Fig 6, to compensate for the effect of top rake and side clearance if the shoulder being formed is to be held to a desired predetermined angle.

Assuming that the top rake angle $c$ is 25° and that the side clearance angle $n$ is 10°, then the tangent of the correction angle $v$ for a square shoulder is $$\text{Tan } v = \tan c \times \tan n$$
$$= .46631 \times .17633$$
$$= .08222$$

Therefore, $$\angle v = 4° 42'$$

From the foregoing it follows that when the shoulder cutting edge is formed as by grinding, the grinding wheel must be so positioned that the working face thereof makes an angle of 4° 42' with a radial line passing through the intersection of the arcuately shaped cutting edge of greater radius with the shoulder cutting edge. The relative positions of the cutter and grinding wheel are shown in Figs. 8, 9 and 10, wherein the reference characters 40 and 41 designate, respectively, a grinding wheel and its axis of rotation.

Figure 7:
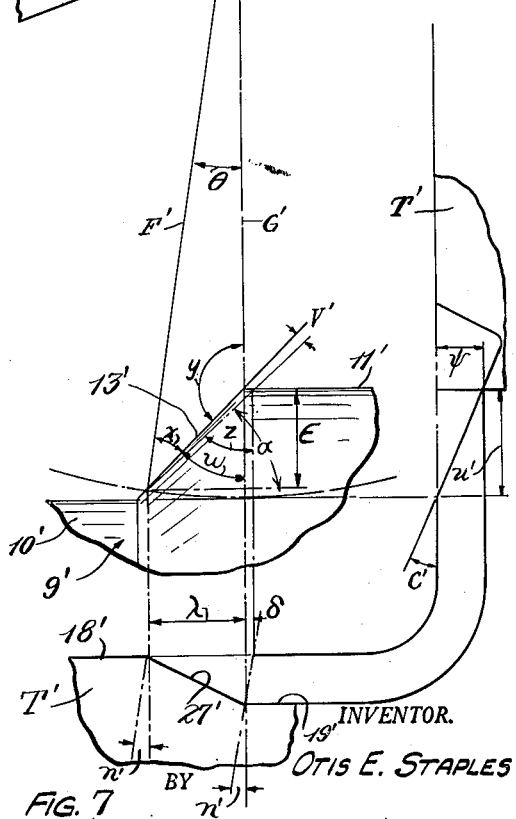

In the event that the adjacent cylindrical sections of the blank are to be connected by a chamfer or bevel instead of by a right-angular shoulder, the correction angle for the cutter shoulder forming edge, corresponding with angle $v$ above, is figured in the following manner. Referring to Fig. 7 wherein the parts corresponding with parts previously referred to are designated by the same reference characters with a prime (') mark affixed thereto, the cylindrical portions 10' and 11' of the work are connected by a shoulder or bevel 13', making an angle $w$ of 45°. Hence, $$\text{Sin } x = \frac{G' \times \sin y}{F'}$$
$$= \frac{1.8125 \times \sin (45° + 90°)}{2}$$
$$= \frac{1.8125 \times .70711}{2}$$
$$= .64082$$
$$\angle x = 39° 51'$$

The angle $\theta$ subtended by the chamfered or beveled surface 27' of the cutter is as follows:

$$\angle \theta = 180° - (y+x)$$
$$= 180° - (135° + 39° 51')$$
$$= 5° 9'$$

$$\lambda = \sin \theta \times F'$$
$$= .08976 \times 2$$
$$= .17952 \text{ inch}$$

$$\epsilon = (F' \cos \theta) - G'$$
$$= (2 \times .99596) - 1.8125$$
$$= .1794 \text{ inch}$$

$$u' = F' - G'$$
$$= 2 - 1.8125$$
$$= .1875 \text{ inch}$$

$$\psi = \tan c' \times u'$$
$$= \tan 25° \times .1875$$
$$= .46631 \times .1875$$
$$= .0875 \text{ inch}$$

$$\delta = \tan n' \times \psi$$
$$= \tan 10° \times .0875$$
$$= .17633 \times .0875$$
$$= .01543 \text{ inch}$$

$$\text{Cotan } z = \frac{\epsilon}{\lambda + \delta}$$
$$= \frac{.1794}{.17952 + .01543}$$
$$= \frac{.1794}{.19495}$$
$$= .92187$$

$$\angle z = 47° 20'$$
$$\angle \alpha = 180° - (90° + \angle z) = 90° - \angle z$$
$$\angle \alpha = 90° - 47° 20' = 42° 40'$$
$$\angle \alpha = \angle w - \angle v'$$
$$\angle v' = \angle w - \angle \alpha$$
$$\therefore \angle v' = 45° - 42° 40' = 2° 20'$$

In the foregoing illustration the uncorrected radii F and G were used. Theoretically, the corrected radii would produce more accurate results. However, from a practical point of view the uncorrected radii are satisfactory since the error resulting from the use thereof is less than present manufacturing tolerances.

The equations just derived with respect to Fig. 7 are general and may be used to determine the correction angle $v'$ for the cutting edge of a tool adapted to form a shoulder of any predetermined angle $w$ on the work. To facilitate the determination of the angle $v'$ it is desirable to express the equation:

$$\text{Cot } z = \frac{\epsilon}{\lambda + \delta}$$

in different form. Remembering that:

$$\epsilon = (F' \cos \theta) - G'$$
$$\lambda = F' \sin \theta$$
$$\delta = \psi \tan n'$$
$$\psi = u' \tan c'$$

then $$\text{Cot } z = \frac{(F' \cos \theta) - G'}{F' \sin \theta + u' \tan c' \tan n'}$$

Since, $$u' = F' - G'$$

and $$\angle \theta = 180° - (x+y)$$

$$\therefore \cot z = \frac{F' \cos [180° - (x+y)] - G'}{F' \sin [180° - (x+y)] + (F' - G') \tan c' \tan n'}$$

$$\angle v' = \angle w - \angle a$$
$$= \angle w - [180° - (90° + \angle z)]$$
$$\angle v' = \angle w - 90° + \angle z$$

It will be seen that when a square shoulder is to be formed on the work, $\angle \theta = 0°$ so that the above general equation for $\cot z$ reduces to $$\cot z = \frac{F' - G'}{(F' - G') \tan c' \tan n'} = \frac{1}{\tan c' \tan n'}$$

or, $$\tan z = \tan c' \tan n'$$

Moreover, since $$\angle w = 90°$$
$$\angle v' = 90° - 90° + \angle z$$
$$\therefore \angle v' = \angle z$$

and $$\tan v' = \tan c' \tan n'$$

Hence, the general equation reduces to the simple form previously given when a square shoulder is to be formed on the work.

When it is desired to form a shoulder on the work having any predetermined angle $w$, the setting of the grinding wheel 40 to form the shoulder cutting edge 27' on the tool must be such that the working face of the wheel is inclined to make an angle $a = \angle w - \angle v'$ with a plane extending from the outer edge of the arcuately shaped cutting surface of greater radius perpendicular to a radial line, extending from the axis of the tool through the intersection of the arcuately shaped cutting surface of lesser radius with the shoulder cutting surface. When the shoulder to be formed on the work is square, this inclination of the grinding wheel is simply expressed as being equal to the correction angle measured from the radial line through the intersection of the outer edge of the arcuately shaped cutting surface of greater radius with the shoulder cutting edge, the inclination being in the direction which increases the angle that the shoulder cutting surface makes with the arcuate cutting surface of greater radius.

As will be understood by those skilled in the art to which the invention relates, the work blank, the finished article, the cutter and the cam can be laid out to scale on drawing paper, as indicated on the drawings, and the various dimensions determined graphically with considerable accuracy, and this method of determining the various dimensions is within the scope of the present invention. In order to obtain the 10% to 20% "underslip" or the 30% or so "overslip" the various arcuately shaped cutting edges which form the respective portions of the blank are made proportionately shorter or longer than the parts to be finished thereby.

After the cutters have been calculated and/or laid out in the manner described, they may be rough formed by conventional equipment in any suitable manner, hardened, and then ground to final size and shape. The side or shoulder cutting edges can be ground by employing a conventional grinding machine having a flat faced grinding wheel, means to produce a linear feed between the wheel and the work, and a work support which may be adjusted to present the work to the face of the grinding wheel at the angles determined as described above.

From the foregoing explanation it will be apparent that the objects of the invention hereto- fore illustrated have been accomplished and that a new and improved method of making a cutter has been devised. While the invention has been described in considerable detail, it will be apparent that certain changes may be made within the scope of the invention, and it is my intention to hereby cover all adaptations, modifications and uses of the invention disclosed herein.

Having thus described my invention, I claim:

1. The method of laying out and making a disk or sector-like tool or cutter having radially offset arcuately shaped cutting edges along one side of the circumference connected by a side cutting edge or edges, which cutter is adapted to turn an article having cylindrical sections connected by a shoulder or shoulders when rotated in cutting relationship with a rotating work blank at variable speed about an axis offset from and angularly disposed with respect to the axis of rotation of the work blank while a relative feed movement is effected between the cutter and work blank lengthwise of the work blank, which method comprises: selecting the radius of one of the arcuately shaped cutting edges of the cutter taking into consideration characteristics of the machine upon which the cutter is to be used, practical limitations upon the size of the cutter, permissible overhang of the cutting edge farthest from the axis of rotation of the cutter, and calculating the radius of the other arcuately shaped cutting edge or edges in accordance with the selected radius and the differences between the radii of the respective cylindrical portions of the article to be turned by the edges; selecting the lengths of the arcuately shaped cutting edges for turning the respective cylindrical portions of the work taking into consideration the usable circumference of the cutter, the speed of rotation of the cutter, the acceleration or deceleration required to clear the shoulder or shoulders to be produced; selecting the top rake angle or angles; determining the front clearance angle or angles for said arcuately shaped cutting edges and providing therefor; determining the side clearance angle or angles for the shoulder forming cutting edge or edges equal to or greater than the angle whose tangent is equal to the depth of undercut divided by one-half the chord of the circle of outside diameter of the work blank at the height of undercut; providing a blank of approximately the desired final form and size; effecting relative rotation between the blank and a grinding wheel supported in cutting relationship about the axis of the blank to form the arcuately shaped sides of the blank; and effecting relative movement between the blank and a grinding wheel supported in cutting relationship in a direction inclined to the axis of rotation of the blank at an angle substantially equal to the desired clearance angle for the shoulder cutting edge with the working face of the grinding wheel inclined to a plane, extending from the outer end of the shoulder cutting edge of the completed cutter perpendicularly to a radial line thereof extending through the intersection of the shoulder cutting edge with the arcuately shaped side of the completed cutter having the lesser radius at an angle substantially equal to $(90° - \angle z)$, where $$\cot z = \frac{F' \cos [180° - (x+y)] - G'}{F' \sin [180° - (x+y)] + (F' - G') \tan c' \tan n'}$$

$F'$ = radius of the adjacent arcuate cutting edge farthest from the axis of rotation of the cutter
$G'$ = radius of the adjacent arcuate cutting edge nearest to the axis of rotation of the cutter
$y = 180°$ — the angle of the shoulder to be formed $$\sin x = \frac{G' \sin y}{F'}$$

$c'$ = top rake angle
$n'$ = side clearance angle.

2. The method of laying out and making a disk or sector-like tool or cutter having radially offset arcuately shaped cylindrical portions provided with cutting edges along one side or end connected by a side cutting edge or edges, which tool is adapted to turn an article having cylindrical sections connected by a shoulder or shoulders when relatively rotated in cutting relationship with a rotating work blank at variable speed about an axis offset from and angularly disposed with respect to the axis of rotation of the work blank with the cutting edges of the tool cutting below the plane of the axis of the work blank perpendicular to the axis of the tool while a relative feed movement is effected between the tool and work blank lengthwise of the work blank, which method comprises: selecting the radius of one of the arcuately shaped cutting edges of the tool taking into consideration characteristics of the machine upon which the tool is to be used, practical limitations upon the size of the tool, permissible overhang of the cutting edge farthest from the axis of rotation of the tool, and determining the radius of the other arcuately shaped cutting edge or edges with respect thereto; selecting the angles subtended by the respective arcuately shaped cutting edges for turning the various cylindrical portions of the work taking into consideration the usable circumference of the tool, the speed of rotation of the tool, the acceleration or deceleration to be given the tool in clearing the shoulder or shoulders to be formed; selecting the top rake angle or angles; correcting the radii of the various arcuately shaped cutting edges incident to their location below the plane of the axis of rotation of the work blank perpendicular to the axis of rotation of the tool; determining the side clearance angle or angles for the shoulder forming cutting edge or edges equal to or greater than the angle whose tangent is equal to the depth of undercut divided by one-half the chord of the circle of outside diameter of the work blank at the height of undercut; providing a blank of approximately the desired final form and size; effecting relative rotation between the blank and a grinding wheel supported in cutting relationship about the axis of the blank to form the arcuately shaped cylindrical portions of the tool; and effecting relative movement between the blank and a grinding wheel supported in cutting relationship in a direction inclined to the axis of rotation of the blank at an angle substantially equal to the desired clearance angle for the side cutting edge with the working face of the grinding wheel inclined to a plane, extending from the outer end of the side cutting edge of the completed tool perpendicularly to a radial line of the tool extending through the intersection of the side cutting edge with the arcuately shaped cylindrical portion of the tool having the lesser radius at an angle approximately equal to $(90° - \angle z)$, where $$\cot z = \frac{F' \cos[180° - (x+y)] - G'}{F' \sin[180° - (x+y)] + (F' - G') \tan c' \tan n'}$$

$F'$ = radius of the adjacent arcuate cutting edge farthest from the axis of rotation of the tool
$G'$ = radius of the adjacent arcuate cutting edge nearest to the axis of rotation of the tool
$y = 180°$ − the angle of the shoulder to be formed $$\sin x = \frac{G' \sin y}{F'}$$

$c'$ = top rake angle
$n'$ = side clearance angle.

3. The method of making a disk or sector-like tool or cutter provided with top rake and having radially offset arcuately shaped cylindrical portions provided with cutting edges along one side or end connected by a side cutting edge, which tool is adapted to turn an article having cylindrical sections connected by a shoulder when rotated in cutting relationship with a rotating work blank at variable speed about an axis offset from and angularly disposed with respect to the axis of rotation of the work blank while a relative feed movement is effected between the tool and work blank lengthwise of the work, which method comprises: providing a blank of approximately the desired final form or shape; effecting relative rotation between the blank and a grinding wheel supported in cutting relationship about the axis of rotation of the blank to form the arcuately shaped cylindrical portions; subsequently grinding the side cutting edge including a clearance angle by effecting relative movement between the blank and a grinding wheel supported in cutting relationship in a path inclined to the axis of rotation of the blank at an angle substantially equal to the desired clearance angle of the side cutting edge with the working face of the grinding wheel inclined to a plane, extending from the outer end of the side cutting edge of the tool perpendicularly to a radial line of the tool extending through the intersection of the side cutting edge with the arcuately shaped cylindrical portion of the tool having the lesser radius at an angle approximately equal to $(90° - \angle z)$, where $$\cot z = \frac{F' \cos[180° - (x+y)] - G'}{F' \sin[180° - (x+y)] + (F' - G') \tan c' \tan n'}$$

$F'$ = radius of the adjacent arcuate cutting edge farthest from the axis of rotation of the tool
$G'$ = radius of the adjacent arcuate cutting edge nearest to the axis of rotation of the tool
$y = 180°$ − the angle of the shoulder to be formed $$\sin x = \frac{G' \sin y}{F'}$$

$c'$ = top rake angle
$n'$ = side clearance angle.

4. The method of laying out and making a disk or sector-like cutter having radially offset arcuately shaped cutting edges along one side of the circumference connected by a side cutting edge or edges, which cutter is adapted to turn an article having cylindrical sections connected by a shoulder or shoulders when rotated in cutting relationship with a rotating work blank at variable speed about an axis offset from and angularly disposed with respect to the axis of rotation of the work blank while a relative feed movement is effected between the cutter and work blank lengthwise of the work blank, which method comprises: providing a blank of approximately the desired final form and size; effecting relative rotation between the blank and a grinding wheel about the axis of the blank to form one of the arcuately shaped side portions of the cutter to a predetermined radius; effecting relative rotation between the blank and a grinding wheel supported in cutting relationship about the axis of the blank to form another of the arcuately shaped side portions of the cutter to a radius determined with respect to the first-mentioned radius and differing therefrom inversely as the diameters of the parts to be turned thereby differ from each other; and forming the side cutting edge or edges by effecting relative movement between the blank and a grinding wheel supported in cutting relationship in a direction inclined to the axis of rotation of the blank at an angle substantially equal to the desired clearance angle of the side cutting edge being formed with the working face of the grinding wheel inclined to a plane, extending from the outer end of the side cutting edge of the completed cutter perpendicularly to a radial line of the cutter extending through the intersection of the side cutting edge with the arcuately shaped side portion of the cutter having the lesser radius, at an angle approximately equal to $(90° - \angle z)$, where $$\text{Cot } z = \frac{F' \cos [180° - (x+y)] - G'}{F' \sin [180° - (x+y)] + (F' - G') \tan c' \tan n'}$$

$F'$ = radius of the adjacent arcuate cutting edge farthest from the axis of rotation of the cutter $G'$ = radius of the adjacent arcuate cutting edge nearest to the axis of rotation of the cutter $y = 180°$ — the angle of the shoulder to be formed $$\text{Sin } x = \frac{G' \sin y}{F'}$$

$c'$ = top rake angle $n'$ = side clearance angle.

5. The method of laying out and making a disk or sector-like cutter having radially offset arcuately shaped cylindrical portions provided with cutting edges along one side or end connected by a side cutting edge or edges, which cutter is adapted to turn an article having cylindrical sections connected by a shoulder or shoulders when rotated in cutting relationship with a rotating work blank at variable speed about an axis offset from and angularly disposed with respect to the axis of rotation of the work blank while a relative feed movement is effected between the cutter and work blank lengthwise of the work blank, which method comprises: providing a blank of approximately the desired final form and size; effecting relative rotation between the blank and a grinding wheel about the axis of the blank to form one of the arcuately shaped cylindrical portions of the cutter to a predetermined radius taking into consideration characteristics of the machine upon which the cutter is to be used, practical limitations upon the size of the cutter, and permissible overhang of the cutting edge farthest from the axis of rotation of the cutter; effecting relative rotation between the blank and a grinding wheel about the axis of the blank to form another of the arcuately shaped cylindrical portions of the cutter to a radius differing from the first-mentioned radius inversely as the diameters of the parts to be turned thereby differ from each other; and forming the side cutting edge or edges by effecting relative movement between the blank and a grinding wheel supported in cutting relationship in a direction inclined to the axis of rotation of the blank at an angle substantially equal to the desired clearance angle of the side cutting edge being formed with the working face of the grinding wheel inclined to a plane, extending from the outer end of the side cutting edge of the completed cutter perpendicularly to a radial line of the cutter extending through the intersection of the side cutting edge with the arcuately shaped cylindrical portion of the cutter having the lesser radius at an angle approximately equal to $(90° - \angle z)$, where $$\text{Cot } z = \frac{F' \cos [180° - (x+y)] - G'}{F' \sin [180° = (x+y)] + (F' - G') \tan c' \tan n'}$$

$F'$ = radius of the adjacent arcuate cutting edge farthest from the axis of rotation of the cutter $G'$ = radius of the adjacent arcuate cutting edge nearest to the axis of rotation of the cutter $y = 180°$ — the angle of the shoulder to be formed $$\text{Sin } x = \frac{G' \sin y}{F'}$$

$c'$ = top rake angle $n'$ = side clearance angle

6. The method of forming a cutter tool for a machine tool comprising: providing a substantially cylindrically-shaped tool blank; forming an arcuately shaped cutting surface on said blank having a radius of a value determined from the finished diameter of the work to be cut thereby and the mode of operation of the tool; forming a second arcuately shaped cutting surface on said tool blank having a radius differing from the radius of the first-mentioned cutting surface by an amount approximately equal to one-half the difference between the diameters of the work to be turned by the two surfaces; providing the arcuately shaped cutting surfaces with top rake having an angle determined from the mode of operation of the tool; and forming a shoulder cutting surface on the portion of the tool blank uniting the two arcuately shaped cutting surfaces by removing material by relative movement between the blank and a material removing means supported to effect material removal in a path inclined to the axis of rotation of the tool at an angle substantially equal to the desired clearance angle of the shoulder cutting surface and at an angle with a plane, extending from the outer edge of the shoulder cutting edge of the completed tool perpendicularly to a radial line of the tool extending through the intersection of the shoulder cutting edge with the arcuately shaped cutting surface having the lesser radius, approximately equal to $(90° - \angle z)$, where $$\text{Cot } z = \frac{F' \cos [180° - (x+y)] - G'}{F' \sin [180° - (x+y)] + (F' - G') \tan c' \tan n'}$$

$F'$ = radius of the arcuate cutting surface of the tool having the greater radius $G'$ = radius of the arcuate cutting surface of the tool having the lesser radius $y = 180°$ — the angle of the shoulder to be formed on the work $$\text{Sin } x = \frac{G' \sin y}{F'}$$

$c'$ = top rake angle $n'$ = side clearance angle.

7. The method of forming a cutter tool for a machine tool comprising: providing a substantially cylindrically-shaped tool blank; forming an arcuately shaped cutting surface on said blank having a radius of a value determined from the finished diameter of the work to be cut thereby and the mode fo operation of the tool; forming a second arcuately shaped cutting surface on said tool blank having a radius differing from the radius of the first-mentioned cutting surface by an amount approximately equal to one-half the difference between the diameters of the work to be turned by the two surfaces; providing the arcuately shaped cutting surfaces with top rake having an angle determined from the mode of operation of the tool; and forming a shoulder cutting surface on the portion of the tool blank uniting the two arcuately shaped cutting surfaces by removing material therefrom by relative movement between the blank and a material removing means supported to effect material removal in a path inclined to the axis of rotation of the tool blank at an angle substantially equal to the desired clearance angle of the shoulder cutting surface and at an angle $z$ with the radial line through the intersection of the shoulder cutting edge with the arcuately shaped cutting surface of greater radius, where $\operatorname{Tan} z = \tan c' \tan n'$ $c'$ = the top rake angle
$n'$ = the side clearance angle.

OTIS E. STAPLES.

REFERENCES CITED

The following references are of record in the file of this patent:

UNITED STATES PATENTS

| Number | Name | Date |
| --- | --- | --- |
| 1,540,757 | Buckingham | June 9, 1925 |
| 1,815,324 | Olson | July 21, 1931 |
| 1,882,692 | Albertson | Oct. 18, 1932 |
| 2,010,353 | Edgar | Aug. 6, 1935 |
| 2,233,399 | Carlin | Mar. 4, 1941 |
| 2,341,668 | Staples | Feb. 15, 1944 |